US012465796B2

(12) United States Patent
Williams et al.

(10) Patent No.: US 12,465,796 B2
(45) Date of Patent: Nov. 11, 2025

(54) NORMALLY CLOSED VALVE FOR DRY PIPE TRIM ON A DIAPHRAGM VALVE

(71) Applicant: Tyco Fire Products LP, Lansdale, PA (US)

(72) Inventors: James O. Williams, Marlborough, MA (US); Joshua Motha, Tiverton, RI (US); Normand James Roy, Coventry, RI (US)

(73) Assignee: Tyco Fire Products LP, Cranston, RI (US)

( * ) Notice: Subject to any disclaimer, the term of this patent is extended or adjusted under 35 U.S.C. 154(b) by 563 days.

(21) Appl. No.: 17/917,494

(22) PCT Filed: May 21, 2021

(86) PCT No.: PCT/IB2021/054452
§ 371 (c)(1),
(2) Date: Oct. 6, 2022

(87) PCT Pub. No.: WO2021/234669
PCT Pub. Date: Nov. 25, 2021

(65) Prior Publication Data
US 2023/0145382 A1 May 11, 2023

Related U.S. Application Data

(60) Provisional application No. 63/028,820, filed on May 22, 2020.

(51) Int. Cl.
A62C 35/68 (2006.01)
F16K 31/122 (2006.01)
(52) U.S. Cl.
CPC .......... A62C 35/68 (2013.01); F16K 31/1221 (2013.01); F16K 31/1223 (2013.01)

(58) Field of Classification Search
CPC ......... A62C 35/62; A62C 35/68; A62C 37/46; A62C 35/60; A62C 35/64; A62C 35/645;
(Continued)

(56) References Cited

U.S. PATENT DOCUMENTS

2014/0182865 A1* 7/2014 Ringer ................... A62C 35/62
169/17
2015/0260306 A1 9/2015 Arnold et al.
(Continued)

FOREIGN PATENT DOCUMENTS

CN 204025701 U 12/2014
CN 108025201 A 5/2018
(Continued)

OTHER PUBLICATIONS

Korean Intellectual Property Office as International Searching Authority; International Search Report and Written Opinion; International Application No. PCT/IB2021/054452; Aug. 18, 2021; 8 pages.

Primary Examiner — Christopher R Dandridge
(74) Attorney, Agent, or Firm — Foley & Lardner LLP

(57) ABSTRACT

A valve assembly includes a body, a spring, a spacer, an interfacing member, a connecting rod, and a plunger. The body includes a first section defining a first opening, a second section defining a chamber, a second opening, and a pressure port, and a third section defining a third opening and a release port. The second section is between the first section and the third section. The spring is positioned within the third opening. The spacer is positioned within the third opening and coupled with the spring. The interfacing member is positioned partially within the third opening and coupled with the spacer. The connecting rod is positioned partially within the second opening and the chamber and
(Continued)

coupled with the interfacing member. The plunger is positioned within the chamber and coupled with the connecting rod.

14 Claims, 5 Drawing Sheets

(58) Field of Classification Search
CPC ...... F16K 7/126; F16K 31/12; F16K 31/1221; F16K 31/1266; Y10T 137/0379; E03D 3/06

See application file for complete search history.

(56) References Cited

U.S. PATENT DOCUMENTS

| | | |
|---|---|---|
| 2016/0279454 A1 | 9/2016 | Ringer et al. |
| 2020/0069985 A1 | 3/2020 | Williams et al. |

FOREIGN PATENT DOCUMENTS

| | | | | |
|---|---|---|---|---|
| CN | 108757991 A | 11/2018 | | |
| JP | S53-125297 U | 11/1978 | | |
| KR | 20100090855 A | 8/2010 | | |
| WO | WO-2018049427 A1 | * | 3/2018 | ............. A62C 35/62 |

* cited by examiner

NORMALLY CLOSED VALVE FOR DRY PIPE TRIM ON A DIAPHRAGM VALVE

CROSS-REFERENCE TO RELATED APPLICATIONS

The present application claims the benefit of priority to U.S. Provisional Application No. 63/028,820, filed May 22, 2020, the disclosure of which is incorporated herein by reference in its entirety.

BACKGROUND

Sprinkler systems utilize fire suppressants (e.g., water, fire suppressant agent, etc.) to suppress fires. The fire suppressant flows from a fire suppressant source to one or more nozzles through piping.

SUMMARY

At least one aspect relates to a valve assembly. The valve assembly includes a body, a spring, a spacer, an interfacing member, a connecting rod, and a plunger. The body includes a first section defining a first opening, a second section defining a chamber, a second opening, and a pressure port, and a third section defining a third opening and a release port. The second section is between the first section and the third section. The spring is positioned within the third opening. The spacer is positioned within the third opening and coupled with the spring. The interfacing member is positioned partially within the third opening and coupled with the spacer. The connecting rod is positioned partially within the second opening and the chamber and coupled with the interfacing member. The plunger is positioned within the chamber and coupled with the connecting rod.

A fire suppression system includes a control valve coupled with piping, an actuator coupled with the control valve, and a valve assembly coupled with the control valve, the actuator, and the piping. The valve assembly includes a body, a spring, a spacer, an interfacing member, a connecting rod, and a plunger. The body includes a first section defining a first opening, a second section defining a chamber, a second opening, and a pressure port, and a third section defining a third opening and a release port. The second section is between the first section and the third section. The spring is positioned within the third opening. The spacer is positioned within the third opening and coupled with the spring. The interfacing member is positioned partially within the third opening and coupled with the spacer. The connecting rod is positioned partially within the second opening and the chamber and coupled with the interfacing member. The plunger is positioned within the chamber and coupled with the connecting rod.

DETAILED DESCRIPTION

Figure 1:
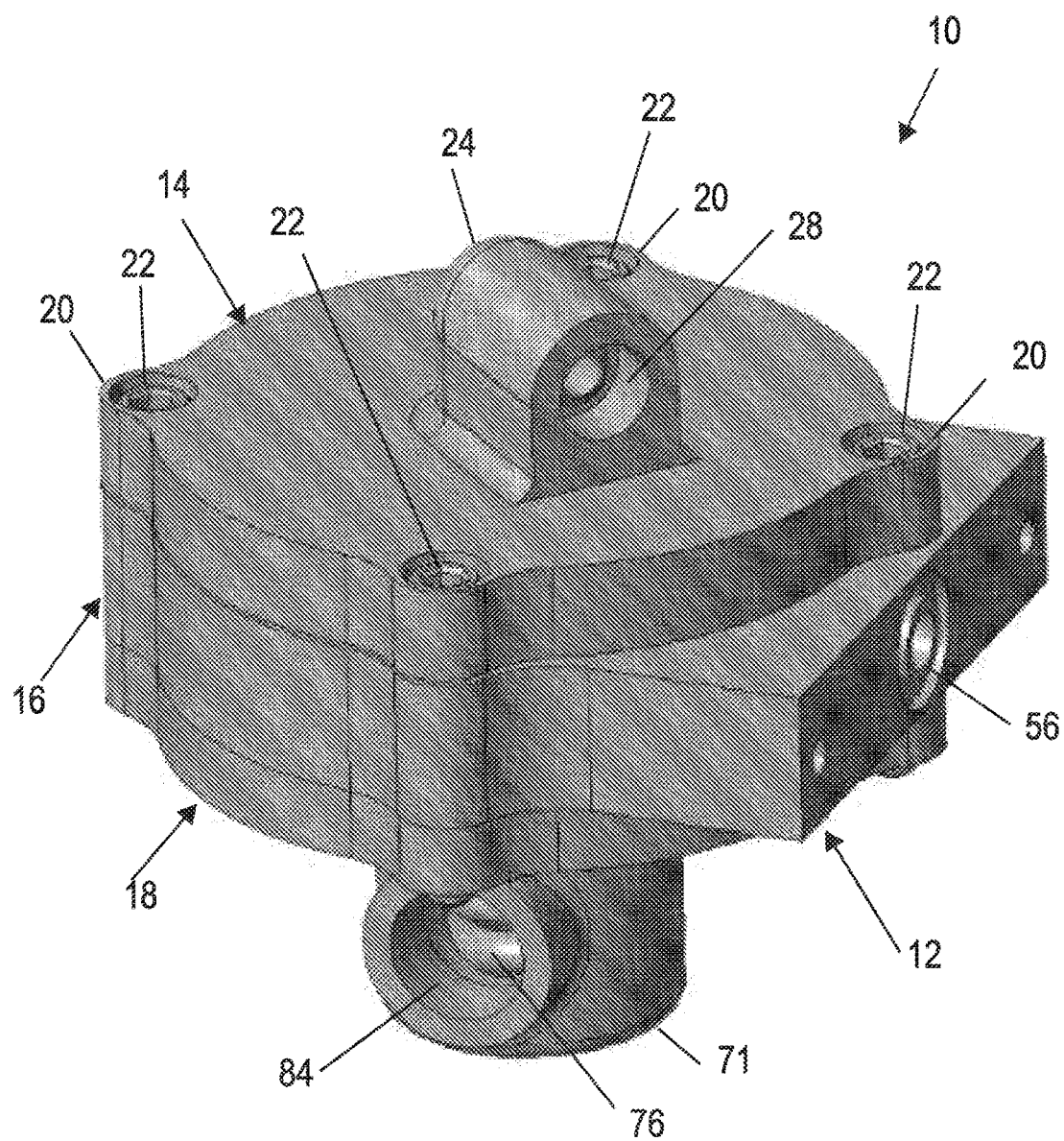
FIG. 1 is a perspective view of an example of a normally closed valve.
Figure 2:
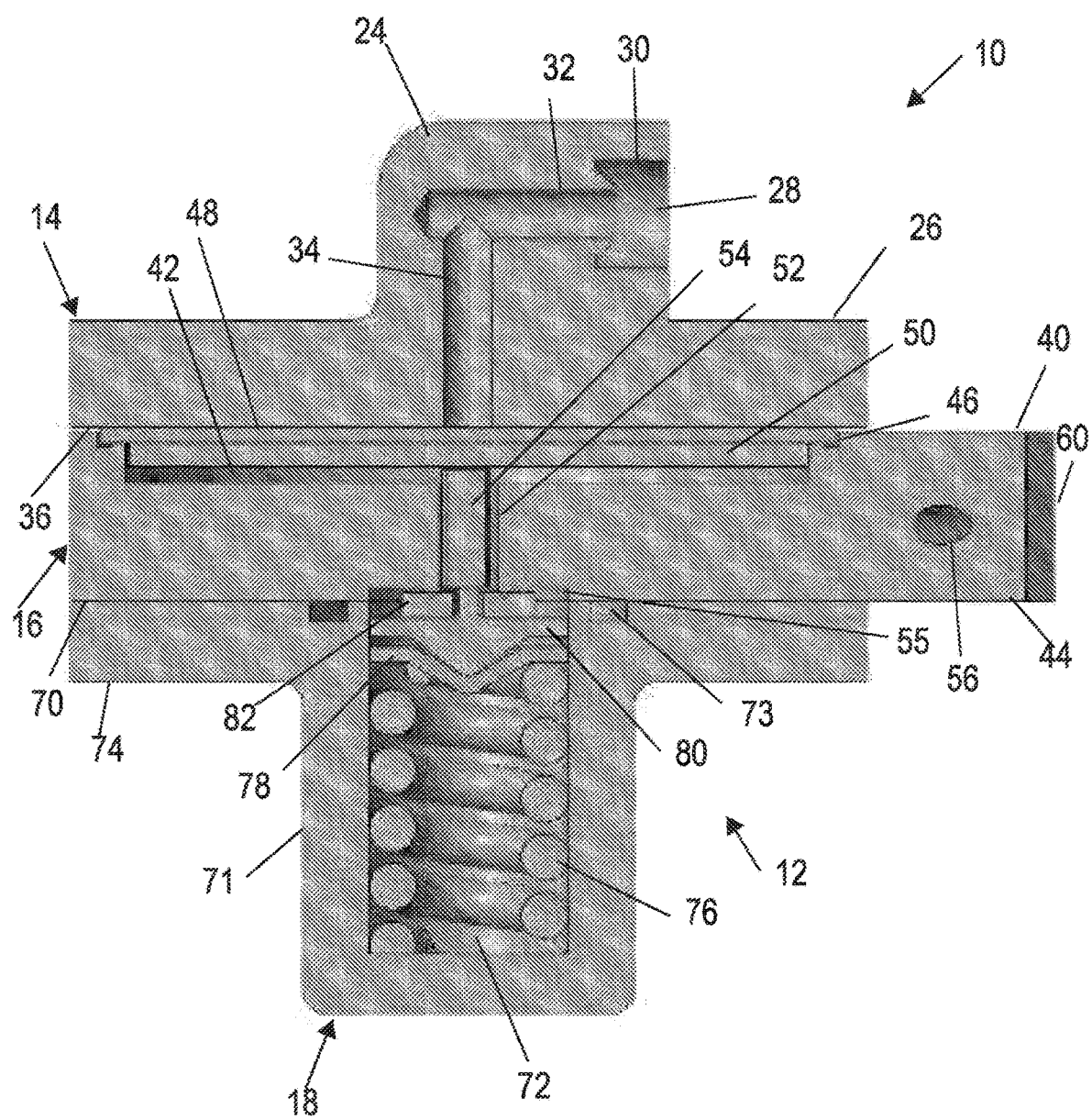
FIG. 2 is a partial section view of an example of a normally closed valve.
Figure 3:
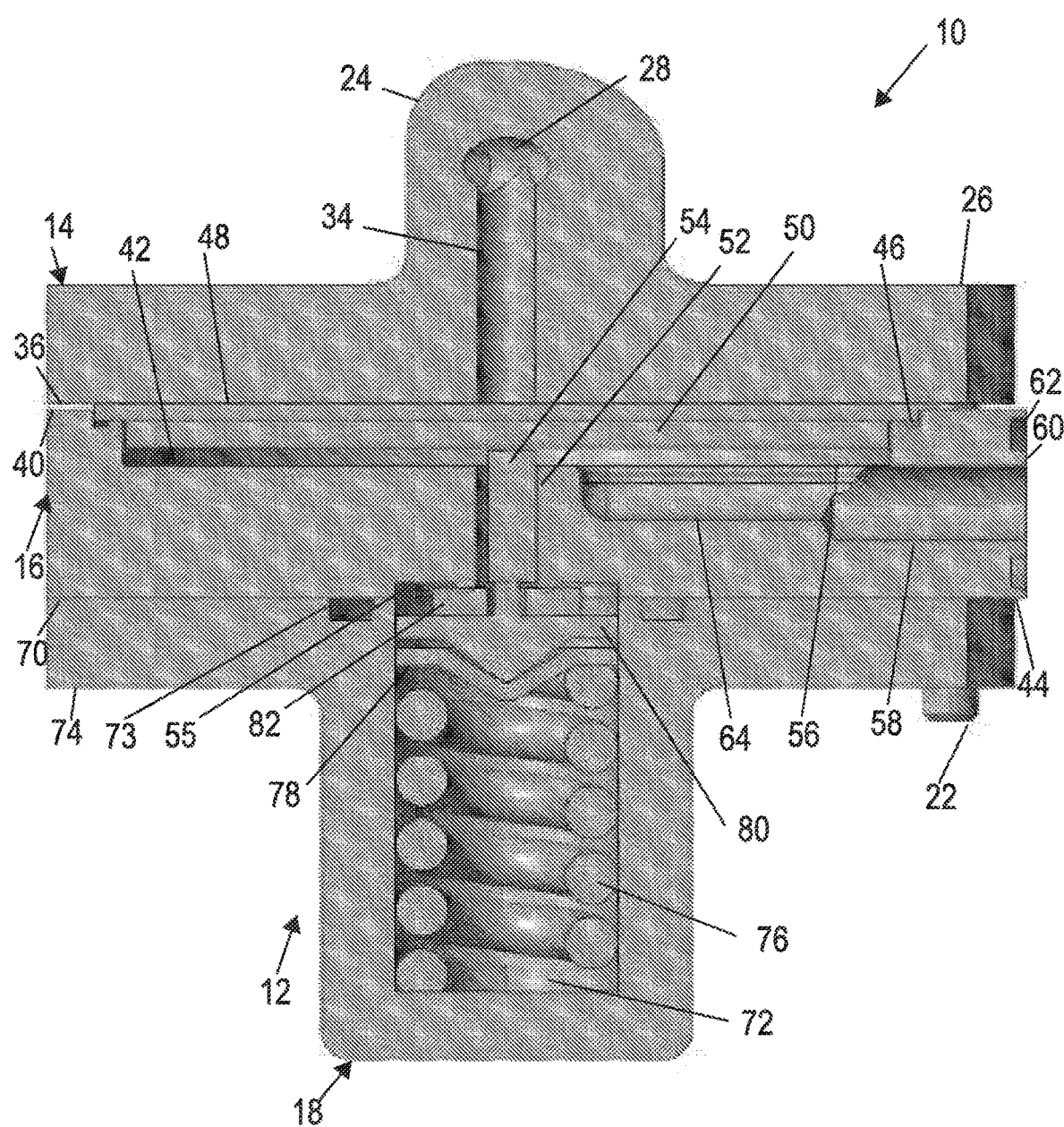
FIG. 3 is a partial section view of an example of a normally closed valve.
Figure 4:
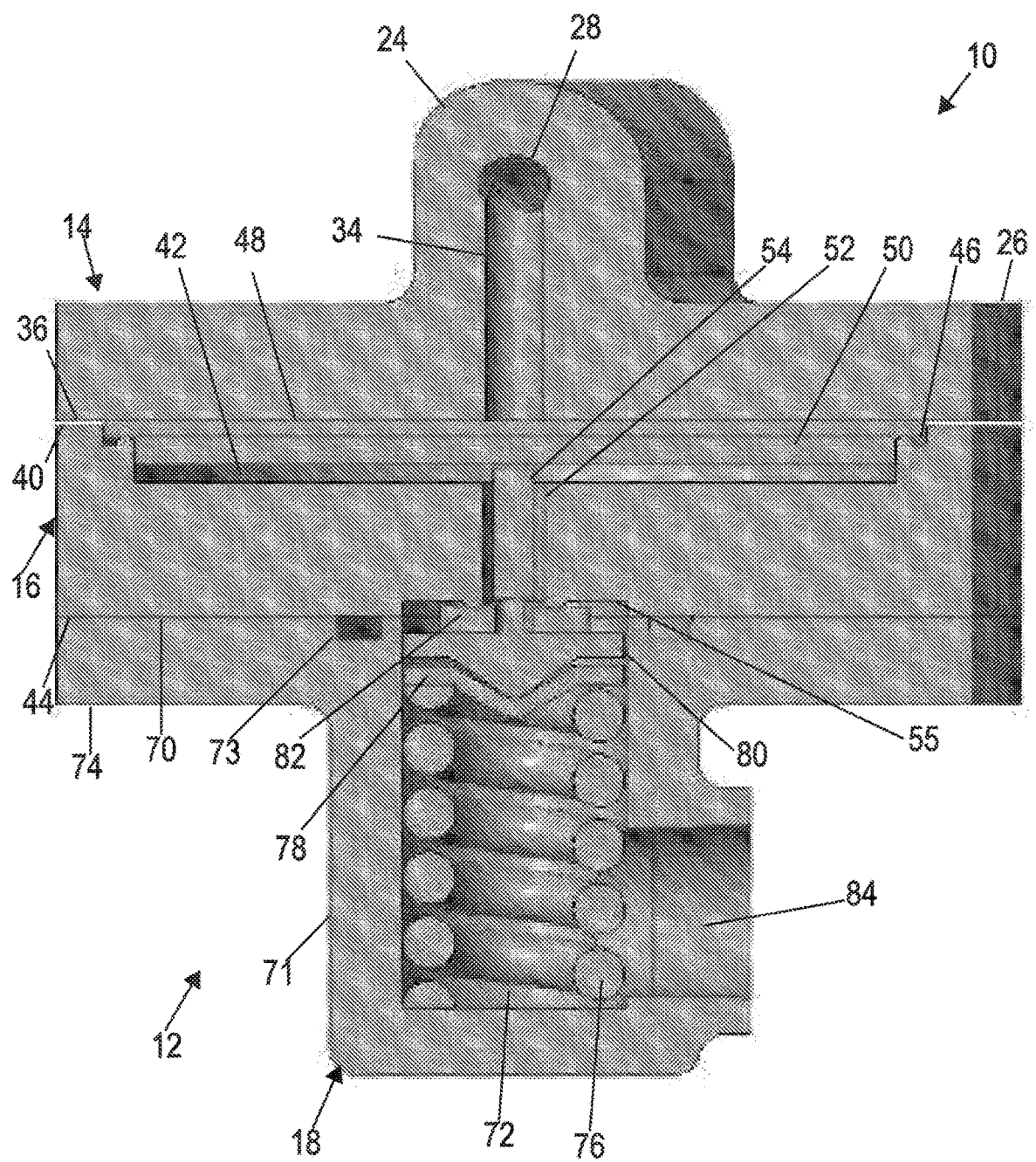
FIG. 4 is a partial section view of an example of a normally closed valve.

Following below are more detailed descriptions of various concepts related to, and implementations of valves for fire suppression systems (e.g., sprinkler systems). The various concepts introduced above and discussed in greater detail below can be implemented in any of numerous ways, including in dry systems and in wet systems, such as to selectively control activation of flow control valves responsive to detection of a fire condition (e.g., responsive to pressure changes resulting from sprinklers opening to allow air or fluids in the system to be outputted; responsive to electronic actuation of one or more actuators or valves based on detecting the fire condition using temperature, heat, gas, smoke, or other sensors).

Fire suppression systems can include piping which facilitates transfer of fire suppressant (e.g., fire suppressant agent, water, etc.) through a space. The fire suppressant can subdue or prevent the spread of a fire in a hazard area. The fire suppression system may include a control valve and an actuator coupled with the control valve. The control valve is used to allow flow of fire suppressant to flow through the control valve to distribution piping and nozzles. The actuator is coupled with the control valve and facilitates activation of the control valve to allow fire suppressant to flow therethrough.

A normally closed valve may be included as part of the fire suppression system. The normally closed valve is coupled with the actuator and the control valve. The normally closed valve limits activation of the control valve by limiting actuation of the actuator. The normally closed valve remains in a closed configuration, limiting fluid release from the actuator. The normally closed valve remains closed until a pressure is sensed at the inlet of the control valve. Responsive to sufficient pressure at the inlet, the normally closed valve opens and allows fluid flow from the actuator which activates the control valve in turn. In some examples, the normally closed valve may receive a first force from the control valve and a second force from the actuator. While the first force is lower than the second force and a spring force, the normally closed valve remains in a closed position. If the first pressure rises above the second force and the spring force, the normally closed valve transitions to an open position. While in the open position, the actuator is able to activate the control valve.

Fire suppression systems can include a normally closed valve fluidly coupled a control valve and an actuator. The normally closed valve includes a first section, a second section, and a third section. The first section, the second section, and the third section are coupled with define a body. Fasteners may be used to couple the first section, the second section, and the third section. A sealing opening is defined in the second section. The sealing opening includes a sealing mechanism. A first opening is defined in the first section. The first opening fluidly couples to the control valve. The first opening coupled with the sealing opening on a top side. A second opening is defined in the third section. The third opening includes a spring. The spring coupled with the sealing mechanism. The sealing mechanism includes a seal that coupled with the first section. A third opening is defined in the second section.

FIGS. 1-4 depict an example of a valve 10. The valve 10 can be positioned within a fire suppression system (e.g., fire suppression system 100 described with reference to FIG. 5). The fire suppression system may be a wet or a dry system. The fire suppression system utilizes a fire suppression agent (e.g., water, etc.) to suppress a fire. For example, a variety of firefighting fluids or fire suppressant agents can be used, including but not limited to water (e.g., may use powders, liquids, foams, or other fluid or flowable materials). The valve 10 can be coupled with a manual activation device and a control valve.

The valve 10 can be a normally closed valve. For example, the valve 10 can define an open state in which a fluid flow path through the valve 10 is provided, and a closed state in which the fluid flow path is blocked. The valve 10 can be defaulted or biased to the closed state, such as through the use of a seal (e.g., plungers or other components described herein) that can be set to the closed state and changed from the closed state to an open state responsive to a fire condition, such as a change in pressure on one or more sides of the seal consistent with the fire condition (e.g., as compared to pressure(s) expected to be applied on the seal during setup or other normal operating conditions).

The valve 10 includes a body 12. The body 12 can define interfaces for the manual activation device and a control valve to couple with. The body 12 includes a first section 14, a second section 16, and a third section 18 (e.g., first, second and third portions). The second section 16 can be between the first section 14 and the third section 18. The sections 14, 16, 18 can be integrally or monolithically formed, or formed from one or more members coupled with one another. For example, the first section 14, the second section 16, and the third section 18 can be coupled with form the body 12. Forming the body 12 with the sections 14, 16, 18 (and components thereof) can enable effective operation of the valve 10 to remain in a closed state until a fire condition occurs, and can enable the body 12 to have a target form factor while enabling connections with various components such as valves, actuators, or piping that can fluidly communicate with seals, plungers, or other components of the valve 10 to enable the valve 10 to normally be in a closed state and be actuated to an open state responsive to a fire condition.

Fastener openings 20 may be defined by each of the first section 14, the second section 16, and the third section 18. The fastener openings 20 can align and receive fasteners 22. The fasteners 22 extend therethrough each of the first section 14, the second section 16, and the third section 18. The fastener openings 20 can be positioned on edges of the body 12 and positioned at a maximum distance from the other fastener openings 20. A portion of the second section 16 can extend beyond edges of the first section 14 and/or the third section 18. The first section 14, the second section 16, and the third section 18 may be the same or different heights.

The first section 14 can include a first protrusion 24 extending from a first surface 26. A first opening 28 (e.g., a pilot opening, etc.) is defined by the first protrusion 24. The first opening 28 can have a larger diameter portion 30 and a smaller diameter portion 32. The larger diameter portion 30 may be positioned outward relative to the smaller diameter portion 32; for example, the larger diameter portion 30 can extend from the first opening 28 inward to the smaller diameter portion 32, which can be between the larger diameter portion 30 and connection port 52. The larger diameter portion 30 can structured to receive a portion of a conduit (e.g., a tube, a pipe, etc.). The conduit may fluidly couple the first opening 28 to a control valve.

The first section 14 can include a second opening 34 between the first opening 28 and connection port 52. The second opening 34 extends from a second surface 36 and can be in fluid communication with the first opening 28. The first opening 28 and the second opening 34 can be perpendicular to each other (e.g., extend along respective longitudinal axes that are perpendicular). The second opening 34 can be in fluid communication with the first opening 28 along the small diameter portion 32. The first opening 28 and the second opening 34 can allow fluid flow through the first section 14.

A first surface 40 of the second section 16 can extend from the second surface 36 of the first section 14. The second section 16 can define a sealing chamber 42. The sealing chamber 42 is defined on the first surface 40 and extends toward a second surface 44 of the second section 16. The sealing chamber 42 may have a circular cross section, or another cross sectional shape. The second opening 34 of the first section 14 can be in fluid communication with the sealing chamber 42 to allow fluid communication between the first section 14 and the second section 16.

A sealing groove 46 can be positioned radially outward of the sealing chamber 42 on the first surface 40 of the second section 16. The sealing groove 46 can receive a seal 48. The seal 48 can form a fluid seal between the first section 14 and the second section 16 when coupled, such as between the second opening 34 and the sealing chamber 42.

A plunger 50 can be positioned within the sealing chamber 42. The plunger 50 can be sized to be a similar diameter (e.g., within a threshold difference, such as +/−10 percent or +−5 percent or less) as the sealing chamber 42 to substantially limit fluid flow through or into the sealing chamber 42. The plunger 50 can selectively interface with the second surface 36 of the first section 14 to selectively limit fluid communication between the second opening 34 and the sealing chamber 42.

The second section 16 can include a connection port 52. The connection port 52 extends from the sealing chamber 42 to the second surface 44. The connection port 52 can receive a connector rod 54. The connector rod 54 can engage the plunger 50. In some examples, the second section 16 includes a first actuating port 55. The first actuating port 55 extends from the connection port 52 to the second surface 44.

The second section 16 can include a pressure port 56. The pressure port 56 is defined between the first surface 40 and the second surface 44. The pressure port 56 can connect with a conduit (e.g., a pipe, a tube, etc.). The pressure port 56 allows fluid communication between the sealing chamber 42 and the conduit or an ambient environment. In some examples, the conduit is fluidly connected to an inlet pipe of the control valve. The pressure port 56 includes a first portion 58. The first portion 58 extends inward from a side surface 60 of the second section 16. A sealing groove 62 can be radially outward from the first portion 58 on the side surface 60. The sealing groove 62 can receive a seal to form a seal between the conduit and the side surface 60. The pressure port 56 can include a second portion 64. The second portion 64 can allow fluid communication between the first portion 58 and the sealing chamber 42.

A first surface 70 of the third section 18 can extend from with the second surface 44 of the second section 16. The third section 18 can include a protrusion 71 extending from a second surface 74. A second actuating port 72 can extend from the first surface 70 into the protrusion 71. The second actuating port 72 can connect with the first actuating port 55 or the connection port 52 of the second section 16.

A sealing groove 73 can be defined radially outward of the second actuating port 72. The sealing groove 73 can receive a seal to form a seal between the second section 16 and the third section 18. The second actuating port 72 can receive one or more of a spring 76, a spacer 78, an interfacing member 80, and a washer 82 (e.g., gasket, seal). The spring 76 with a bottom of the second actuating port 72 and the spacer 78. The spacer 78 can include flat outer portions to interface with the spring 76 and allow exert a force to be exerted on the spacer 78 and move the spacer 78 within the first actuating port 55 and the second actuating port 72. The spacer 78 coupled with the interfacing member 80. The interfacing member 80 and the spacer 78 may have a similar shape to limit deformation or decoupling. The spacer 78 coupled with the connector rod 54. The washer 82 limits movement of the spacer 78 into the connection port 52. A release port 84 is defined in the protrusion 71 and extends to the second actuating port 72. The release port 84 allows fluid communication between the second actuating port 72 and either an ambient environment or a conduit (e.g., a tube, a pipe, etc.). The conduit can fluidly couples the valve 10 with an actuator.

Figure 5:
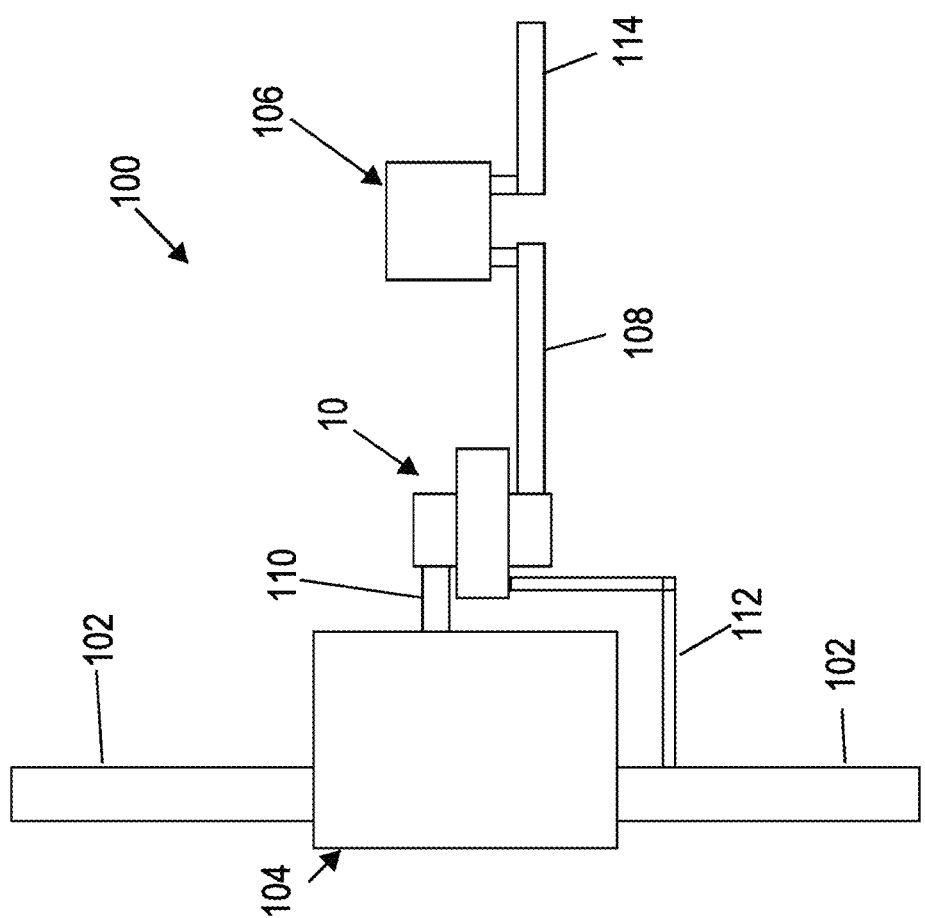
FIG. 5 is a schematic diagram of an example of a fire suppression system.

FIG. 5 depicts an example of a fire suppression system 100 in which the valve 10 can be installed. The fire suppression system 100 includes a piping 102 to direct water throughout a building. The piping 102 can be coupled with an inlet and an outlet of a control valve 104. The control valve 104 can actuate to limit or allow flow of water from the inlet to the outlet.

An actuator 106 can be coupled with the control valve 104 via conduit 108, conduit 110, and the valve 10. The actuator 106 can facilitate actuation of the control valve 104 by a release of fluid and/or pressure from an outlet of the actuator 106. For example, the actuation can result from a pressure drop when fluid or pressure is vented. The valve 10 is fluidly coupled with the control valve 104. Specifically, the larger diameter portion of the first opening 28 is fluidly coupled with the control valve 104 via the conduit 108. The valve 10 is also fluidly coupled with the actuator 106. Specifically, the release port 84 is fluidly coupled with an inlet of the actuator 106 via conduit 110. The valve 10 is also coupled with the piping 102 near or at the inlet of the control valve 104. Specifically, the pressure port 56 is fluidly coupled with the piping 102 to sense a pressure of fluid entering or within the inlet of the control valve 104 via conduit 112. In other examples, the sensing is accomplished electronically by a supervisory circuit within the control valve 104. An electric signal is transmitted to the valve 10 to actuate to an open position when the supervisory circuit senses a pressure within the control valve 104.

During functioning of the valve 10, the valve 10 is closed to limit fluid communication between the control valve 104 and the actuator 106, to limit activation of the actuator 106 and further the control valve 104. The valve 10 actuates between a closed and an open position in response to a pressure within the inlet of the control valve 104. While in the closed position, the spring 76 exerts a force on the spacer 78, which via the interfacing member 80 and the connector rod 54, exerts a force on the plunger 50. The force exerted on the plunger 50, forces the plunger 50 against the second surface 36 of the first section 14, sealing the second opening 34 from fluid communication with the sealing chamber 42 and the release port 84. Further, while in the closed position, the valve 10 limits flow of fluid from the control valve 104 to the actuator 106 to limit activation of the actuator 106 and the control valve 104. While in the open position, the first opening 28 may receive a pressure (e.g., fluid under pressure) from the inlet of the control valve 104 or the piping 102. The pressure may be due to water flowing into the control valve 104. The pressure can be exerted on the plunger 50 via the pressure port 56. The force exerted by the pressure on the plunger 50 can be greater than the force exerted by the spring 76, forcing the plunger 50 downwards (e.g., the valve 10 can be normally closed due to the arrangement of the plunger 50 and the forces used to change the state of the plunger 50 to open the valve 10). While in the open position, fluid is able to flow from the first opening 28 to the release port 84, allowing for activation of the actuator 106.

The valve 10 may actuate between the closed position (e.g., closed state) and the open position (e.g., open state). Actuation from the closed position to the open position limits unwanted activation of the actuator 106 by locking out the actuator 106 from the control valve 104. Actuation between the closed position and the open position may be automatic (e.g., triggered responsive to a particular condition occurring). Monitoring alarm signals within the fire suppression system 100 may be limited while the valve 10 is in the open position. The pressure sensed by the pressure port 56 may facilitate this actuation. For example, the valve 10 can change from the closed position to the open position responsive to the pressure received by the pressure port 56 exerting a force on the plunger 50 greater than the force exerted by the spring 76. Responsive to the pressure received by the pressure port 56 decreasing to where the pressure exerts a force less than the force exerted by the spring 76, the valve 10 can close. The valve 10 may also actuate to the open position in response to an electrical signal. The electrical signal may be from a supervisory circuit that senses pressure within the control valve 104.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A valve assembly, comprising:
a body comprising:
a first section defining a first opening having a larger diameter portion structured to receive a portion of a conduit and a smaller diameter portion inward from the larger diameter portion;
a second section defining a chamber, a second opening, and a pressure port; and
a third section defining a third opening and a release port, the second section between the first section and the third section;
a spring positioned within the third opening;
a spacer positioned within the third opening and coupled with the spring;
an interfacing member positioned partially within the third opening and coupled with the spacer;
a connecting rod positioned partially within the second opening and the chamber and coupled with the interfacing member; and
a plunger positioned within the chamber and coupled with the connecting rod, the spring to bias the plunger to a first state in which the first opening is sealed from the chamber, the plunger to change from the first state to a second state to control fluid flow through the body, the plunger configured to move to the second state, in which the first opening is open to the chamber, based on a first force exerted on the plunger by a fluid received through the pressure port being greater than a second force exerted by the spring on the plunger.

2. The valve assembly of claim 1, comprising:
the plunger defines an open position corresponding to the second state in which the plunger is spaced from the first section.

3. The valve assembly of claim 1, comprising:
the plunger defines a closed position corresponding to the first state in which the plunger engages the first section.

4. The valve assembly of claim 1, comprising:
the plunger limits fluid flow between the first opening and the release port while in the first state.

5. The valve assembly of claim 1, comprising:
the plunger allows fluid flow between the first opening and the release port while in the second state.

6. The valve assembly of claim 1, comprising:
the spring exerts the second force on the plunger using the spacer, the interfacing member, and the connecting rod.

7. The valve assembly of claim 1, comprising:
the plunger moves from an open position corresponding to the second state to a closed position corresponding to the first state responsive to the first force being less than the second force.

8. A fire suppression system comprising:
a control valve coupled with piping;
an actuator coupled with the control valve; and a valve assembly coupled with the control valve, the actuator, and the piping and comprising:
  a body comprising:
    a first section defining a first opening having a larger diameter portion structured to receive a portion of a conduit fluidly coupled with the control valve and a smaller diameter portion inward from the larger diameter portion;
    a second section defining a chamber, a second opening, and a pressure port coupled with an inlet of the control valve; and
    a third section defining a third opening and a release port fluidly coupled with an inlet of the actuator, the second section between the first section and the third section;
  a spring positioned within the third opening;
  a spacer positioned within the third opening and coupled with the spring;
  an interfacing member positioned partially within the third opening and coupled with the spacer;
  a connecting rod positioned partially within the second opening and the chamber and coupled with the interfacing member; and
  a plunger positioned within the chamber and coupled with the connecting rod, the spring to bias the plunger to a first state in which the first opening is sealed from the chamber, the plunger to change from the first state to a second state to control fluid flow through the body, the plunger configured to move to the second state, in which the first opening is open to the chamber, based on a first force exerted on the plunger by a fluid received through the pressure port being greater than a second force exerted by the spring on the plunger.

9. The fire suppression system of claim 8, comprising:
the actuator, responsive to operation of the valve assembly, facilitates activation of the control valve to allow fluid to flow through the control valve.

10. The fire suppression system of claim 8, comprising:
the plunger defines an open position corresponding to the second state in which the plunger is spaced from the first section.

11. The fire suppression system of claim 8, comprising:
the plunger limits fluid flow between the first opening and the release port while in the first state.

12. The fire suppression system of claim 8, comprising:
the plunger moves from an open position corresponding to the second state to a closed position corresponding to the first state responsive to the first force being less than the second force.

13. The fire suppression system of claim 8, comprising:
the plunger defines a closed position corresponding to the first state in which the plunger engages the first section.

14. The fire suppression system of claim 8, comprising:
the spring exerts the second force on the plunger using the spacer, the interfacing member, and the connecting rod.

* * * * *